Patented May 13, 1930

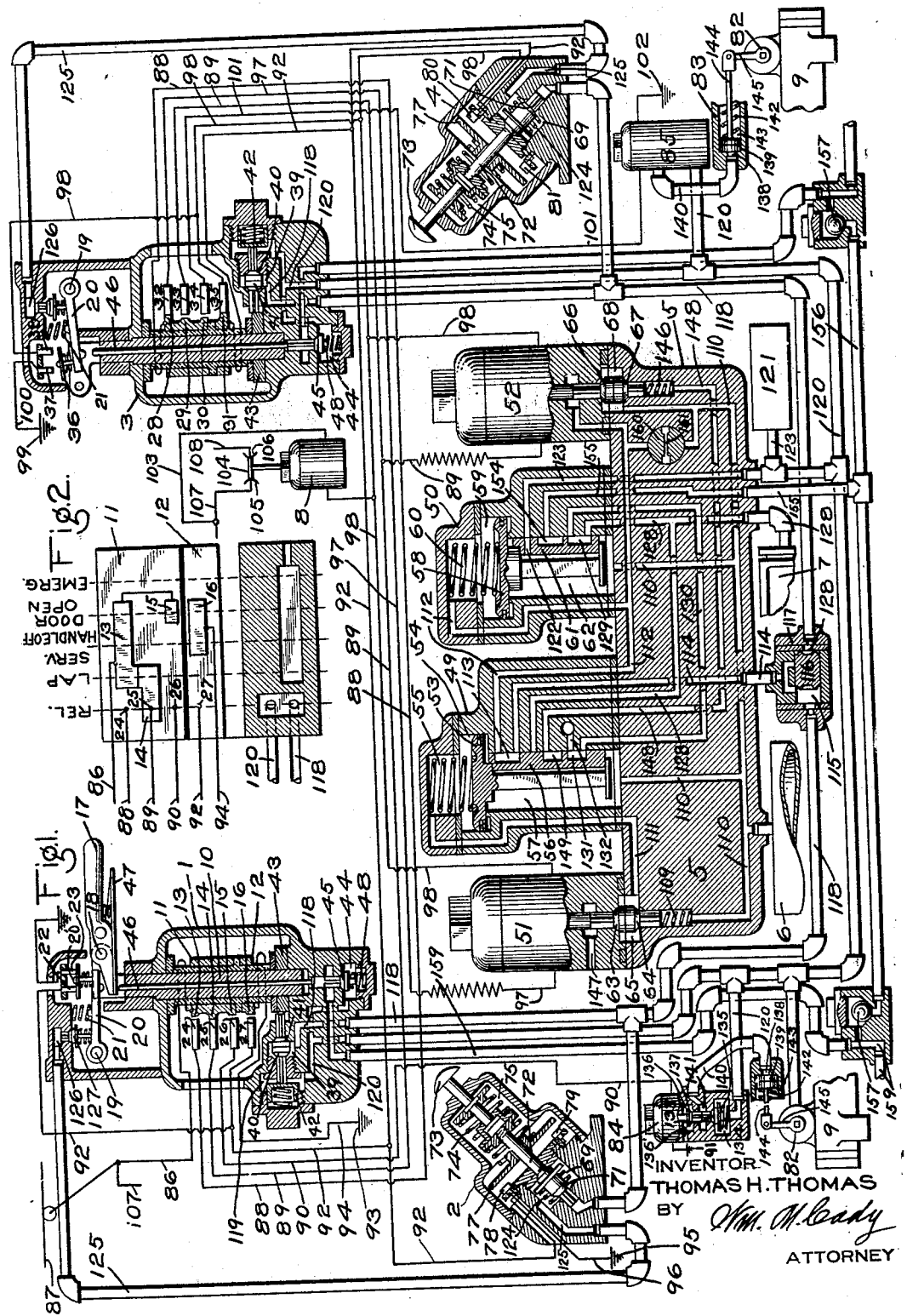

1,758,724

UNITED STATES PATENT OFFICE

THOMAS H. THOMAS, OF EDGEWOOD, PENNSYLVANIA, ASSIGNOR TO THE WESTING-
HOUSE AIR BRAKE COMPANY, OF WILMERDING, PENNSYLVANIA, A CORPORATION
OF PENNSYLVANIA

ELECTROPNEUMATIC BRAKE

Application filed August 13, 1928. Serial No. 299,136.

This invention relates to safety car control equipments, and the principal object of my invention is to provide an improved and simplified electro-pneumatic safety car control and brake equipment.

Another object of my invention is to provide an electro-pneumatic brake equipment in which an operator may prevent an emergency application of the brakes from being effected when the electrical portion is unintentionally deenergized and in which after such deenergization, the operator may effect an application of the brakes when he so desires.

A further object of my invention is to provide an electro-pneumatic brake equipment having means operative manually to control the brakes after an emergency application of the brakes has been effected upon the unintentional deenergization of the electric portion of the equipment.

Other objects and advantages will appear in the following more detailed description of the invention.

In the accompanying drawing, Fig. 1 is a diagrammatic view, mainly in section, of a safety car control equipment embodying my invention; and Fig. 2 is a diagrammatic development of a combined brake switch and brake valve device.

The safety car control equipment shown in the drawing, is of the double end type and comprises a combined brake switch and brake valve device 1 and a combined foot switch and foot valve device 2, both of which are located at one end of a car. Located at the other end of the car there are like devices 3 and 4 respectively.

This equipment also comprises an electropneumatic brake controlling device 5, a main reservoir 6 or other fluid pressure supply source, a brake cylinder 7, a magnet switch device 8 for controlling the electric circuit to the car motors, and door engines 9.

The combined brake switch and brake valve device 1 comprises a casing in which a spindle or stem 10 is rotatably mounted. Associated with the spindle 10 are contact drums 11 and 12 which are insulated from each other, the drum 11 having contacts 13, 14, and 15, and the drum 12 having a contact 16. For clearness of description, the drums 11 and 12 are shown developed in Fig. 2.

The upper end of the spindle 10 is provided with spaced jaw portions, between which a removable handle 17 is pivotally mounted on a fulcrum pin 18 mounted in the jaw portions.

Pivotally mounted on a pin 19, secured in the casing, is an arm 20 which is adapted to be engaged by the inner end portion of the lever 17, and this arm is urged downwardly against the lever by a coil spring 21 interposed between the arm and casing. The free end of the arm carries a connector 20′ adapted to be moved into and out of connecting contact with contact terminals 22 and 23 mounted in the casing, the movement of the arm being controlled by the operation of the lever 17 as hereinafter more fully described.

Mounted in the casing are stationary contact terminals 24, 25, and 26, which are adapted to be engaged by the contacts 13, 14, and 15 respectively of the drum 11. Also mounted in the casing is a contact terminal 27 which is adapted to be engaged by the contact 16 of the drum 12. As hereinbefore stated, the devices 1 and 3 are preferably identical in construction, but for clearness of description, the contacts on the drum 11 of the device 3, which in a structural sense, correspond to the contacts of the device 1, are designated by the reference characters 28, 29, and 30, and the contacts on the drum 12 by the reference character 31. The contact terminals with which these contacts engage are designated by the reference characters 32, 33, 34, and 35 respectively. Further. the connector carried by the arm 20 of the device 3 is designated by the reference characters 36, and the contact terminals with which this connector is adapted to engage are designated by the reference characters 37 and 38.

Contained in a valve chamber 39 in the casing of each of the devices 1 and 3, are double beat valves 40 and 41, the valve 40 having a stem in engagement with a spring actuated plunger 42, and the valve 41 having a stem adapted to be engaged by a cam 43 carried by the spindle 10.

Contained in a valve chamber 44 in the casing of each of the devices 1 and 3 is a valve 45 having a stem 46 which extends through an axial bore in the spindle 10 and at its upper end is adapted to be engaged by a sanding lever 47 pivotally mounted on the handle 17. Also contained in the chamber 44 is a spring 48 which is adapted to maintain the valve 45 normally seated.

The electro-pneumatic brake controlling device 5 may comprise a casing containing a service valve device 49, an emergency valve device 50, a release magnet valve device having a magnet 51, and a service magnet valve device having a magnet 52.

The service valve device 49 comprises a piston 53 contained in a piston chamber 54 and subject to the pressure of a spring 55, which piston is adapted to operate a slide valve 56 contained in a valve chamber 57.

The emergency valve device 50 comprises a piston 58 contained in a piston chamber 59 and subject to the pressure of a spring 60, which piston is adapted to operate a slide valve 61 contained in a valve chamber 62.

The magnet 51 is adapted to control the operation of valves 63 and 64 contained in a valve chamber 65, and the magnet 52 is adapted to control the operation of valves 66 and 67 contained in a valve chamber 68.

The combined foot switch and foot valve device 2 may comprise a casing having a valve chamber 69 containing a valve 71 which is operative through the medium of a stem 72 which extends through the casing, the outer end of the stem being provided with a foot button 73. The stem 72 is subject to the pressure of a spring 74 contained in a chamber 75 in the casing.

Also contained in the chamber 75 and operative by the stem 72 through the medium of a spring 76, is a connector 77 which is adapted to be moved into and out of connecting engagement with the contact terminals 78 and 79 mounted in the casing.

It has been heretofore stated that the combined foot switch and foot valve devices 2 and 4 are alike in construction, but for clearness of description, the contact terminals of the device 4, which correspond to the contact terminals 78 and 79 of the device 2, are indicated by reference characters 80 and 81.

The door engines 9 are of the usual type and are each subject to the pressure of fluid supplied by a rotary valve device 82 which may also be of the usual type. For controlling the operation of the valve device 82, a piston device 83 is provided, the operation of the piston device at one end of the car being controlled by a magnet valve device having a magnet 84, and the device at the other end of the car being controlled by a magnet valve device having a magnet 85.

The drum 11 of the combined brake switch and brake valve device 1 is permanently connected to a current supply wire 86 which is provided at one end of the car only, and which may be supplied with current from the trolley wire 87, through the medium of the usual trolley mechanism, or may be supplied from any other desired current source.

The contact terminal 24 of the device 1 is permanently connected to the drum 11 of the device 3 by a wire 88; the contact terminal 25 is connected to the contact terminal 33 of the device 3 by a wire 89; the contact 26 is connected to one terminal of the magnet 84 by a wire 90, the other terminal of the magnet being connected to ground at 91; the contact 27 is connected to the drum 12 of the device 3 by a wire 92, and the drum 12 of the device 1 is connected to ground at 93 by a wire 94. The wire 92 is also connected to the contact terminals 79 and 80 of the devices 2 and 4 respectively. The contact terminal 78 is connected to ground at 95 by wire 96.

The contact terminal 32 of the combined brake switch and brake valve device 3 is connected to one terminal of the release magnet 51 by a wire 97. The other terminal of this magnet is connected to the contact terminal 35 of the device 3 by a wire 98, which wire is also connected to the contact terminal 81 of the device 4. One terminal of the service magnet 52 is connected to the wire 89 and the other terminal to the wire 98.

The wire 98 is also connected to the contact terminal 38 of the device 3, the contact terminal 37 being connected to ground at 99 by a wire 100.

The contact 34 of the device 3 is connected to one terminal of the magnet 85 by a wire 101, the other terminal of the magnet being connected to ground at 102.

One terminal of the magnet of the magnet switch device 8 is connected to the wire 98 and the other terminal is connected to a wire 103 which is connected to the supply wire 107. This magnet switch device 8 has a switch member 104 which is operative into and out of engagement with switch contacts 105 and 106, the contact 105 being connected to the supply wire 86 by the wire 107 and the contact 106 being connected to one terminal of the usual car motor (not shown) by a wire 108. The usual controller means (not shown) for controlling the supply of current to the car motor through the wires 107 and 108 may be employed.

In operation, with the combined brake switch and brake valve device 1 in release position and the device 3 in service handle off position, the contact terminal 25 will be engaged by the contact 14 on the drum 11 of the device 1, and the contact terminal 32 will be engaged by the contact 28 of the drum 11 of the device 3 and the contact terminal 35 will be engaged by the contact 31 on the drum 12. With the handle 17 of the device 1 in release position, the connector 20' of this device will connect the contact terminals 22 and 23.

When the contacts are thus made, an electric circuit through the service magnet 52 is completed, and current flows through this circuit from the trolley wire 87 by way of wire 86, drum 11 of the device 1, wire 89, through magnet 52, energizing it, wire 98, to the drum 12 of the device 3 and from thence through wire 92 and connector 20' of the device 1 to ground.

Since the circuit wire 98 is thus grounded, current flows through the magnet of the magnet switch device 8, energizing it so that the connector 104 will be maintained in connecting engagement with the switch contacts 105 and 106 and the motor circuit will thus be closed.

It will be noted that while the circuit wire 98, which is connected to one terminal of the release magnet 51, is supplied with current, and the wire 97, which is connected to the other terminal of the magnet 51, is connected to the wire 88 through the drum 11 of the device 3, current will not flow through the magnet 51, for the reason that this circuit is open in the device 1, thus the magnet 51 will be deenergized.

With the magnet 51 deenergized, the valve 63 will be maintained seated and the valve 64 unseated by the pressure of a spring 109. With the magnet 52 energized, the valve 66 will be maintained unseated and the valve 67 seated.

Fluid under pressure from the reservoir 6 is at all times supplied to the valve chambers 57 and 62 of the service and emergency valve devices 49 and 50 respectively through passage 110. With the valve 64 unseated, fluid under pressure flows from passage 110 to the piston chamber 54 of the service valve device 49 by way of valve chamber 65 and passage 111.

With the valve 66 unseated, fluid under pressure flows from passage 110 to the piston chamber 59 of the emergency valve device by way of valve chamber 68 past the unseated valve 66 and through passage 112, which passage also leads to the seat of the service slide valve 56. From the passage 112 fluid under pressure flows to the valve chamber 39 of the combined brake switch and brake valve device 1 by way of a cavity 113 in the side valve 56, passage and pipe 114, valve chamber 115 at one side of a check valve 116 contained in a casing 117, and then through pipe and passage 118.

In the release position of the device 1, the valve 40 is unseated, so that fluid under pressure supplied to the valve chamber 39 may flow to the chamber 119 containing the plunger 42, and from thence through a passage and pipe 120 and pipe 123 to the sandling reservoir 121. The pipe 120 and sanding reservoir 121 are also supplied with fluid under pressure from the valve chamber 62 of the emergency valve device 50 by way of a port 122 in the emergency slide valve 61 and passage and pipe 123. Fluid under pressure from the pipe 120 also flows to the plunger chamber 119 of the device 3 by way of passage 120. From the passages 120 the valve chambers 44 of both of the devices 1 and 3 are supplied with fluid under pressure.

Normally the combined foot switch and foot valve devices 2 and 4 are in the positions shown in the drawing, in which positions the valves 71 are maintained unseated by the pressure of springs 124 contained in the valve chambers 69.

With the valve 71 of the device 2 unseated, fluid under pressure flows from the pipe and passage 118 into valve chamber 69 and therefrom through a passage and pipe 125 into a chamber 126 in the device 1. Leading from the chamber 126 is an atmospheric passage, communication through which is controlled by a valve 127 operative by the arm 20. Since, under normal conditions, the operator maintains the handle 17 of the device 1 in the position shown in the drawing, the valve 127 will be maintained seated, thus preventing the flow of fluid under pressure from the chamber 126 to the atmosphere.

Since the device 3 is in service position and the handle 17 removed, the cam 43 maintains valve 41 unseated and the valve 40 seated, so that the valve chamber 128 of the check valve device 117 is vented to the asmosphere by way of pipe and passage 118, valve chamber 39 in the device, past the unseated valve 41 to atmosphere. With the handle 17 removed, the pressure of the spring 21 will maintain the arm 20 in its lower position, as shown in the drawing, in which position the connector 36 will be out of contact with the contact terminals 37 and 38 and the valve 127 will be unseated. With the valve 127 of the device 3 unseated, the valve chamber 69 of the device 4 is connected to atmosphere through passage and pipe 125 and chamber 126 of the device 3.

Since the piston 53 of the service valve device 49 and the piston 58 of the emergency valve device are in their release positions, as shown in the drawing, the brake cylinder is connected to atmosphere through passage and pipe 128, a cavity 129 in the emergency slide valve 61, passage 130, cavity 131 in the service slide valve 56 and atmospheric passage 132.

From the pipe 120, fluid under pressure is supplied in the usual manner to a piston chamber at one side of one of the pistons (not shown) of each of the door engines 9, thus maintaining the car doors closed.

With the device 1 in release position, the magnet 84 of the door controlling magnet valve device will be deenergized, and a valve 133, contained in a valve chamber 134 which is supplied with fluid under pressure from the pipe 120, will be maintained seated by the pressure of a spring 135 also contained in the valve chamber. Connected to the valve 133, and contained in a valve chamber 136 which is connected to atmosphere, is a valve 137, which is unseated when the valve 133 is seated, thus connecting the piston chamber 138 at one side of the piston 139 of the piston device 83 to the atmosphere by way of pipe 140, a chamber 141 in the magnet valve device, valve chamber 136 and atmospheric passage 136'.

With the piston chamber 138 thus connected to atmosphere, the pressure of a spring 142 contained in a chamber 143 in the piston device 83 and acting upon one side of the piston 139 will through the medium of the piston stem 144 and a lever arm 145 maintain the valve device 82 in the position to supply fluid under pressure to the door engine 9 to maintain the doors closed.

With the device 3 in service handle off position, the magnet 85 of the other door controlling magnet valve device will be deenergized, so that the adjacent door engine will be maintained in its door closed position in the same manner as has been described in connection with the other door engine.

It will here be noted that in all positions of the devices 1 and 3 with the exception of the service door open position, the magnets 84 and 85 will be deenergized and the doors maintained closed.

To effect a service application of the brakes, the device 1 is operated to service position, in which, the circuit through the service magnet 52, which has been described in connection with the release position of the device 1, is opened, thus deenergizing the magnet 52. In the service position of the device 1, the contact 13 on the drum 11 of the device 1 contacts with the contact terminal 24 and the contact 16 on the drum 12 contacts with the contact terminal 27, thus closing an electric circuit through the release magnet 51. With this circuit thus closed, current from the trolley wire 87 flows through supply wire 86, drum 11 of the device 1, wire 88, drum 11 of the device 3, wire 97, magnet 51, wire 98, drum 12 of the device 3, wire 92, drum 12 of the device 1, and from thence to ground 93 through wire 94, thus energizing the release magnet 51.

Upon deenergization of the service magnet 52, the pressure of a spring 146 causes the valve 66 to seat and the valve 62 to unseat, and upon energization of the magnet 51, the valve 63 is unseated and the valve 64 seated.

The seating of the valve 64 closes off the supply of fluid under pressure from the reservoir 6 to the piston chamber 54 of the service valve device 49, and the unseating of the valve 63 permits fluid under pressure in the chamber 54 to be vented to the atmosphere by way of passage 111, valve chamber 65 in the release magnet valve device and an atmospheric passage 147. Pressure of fluid in the valve chamber 57 acting on the under side of the piston 53 causes it to move upwardly to its application position, carrying with it the slide valve 56.

With the slide valve 56 in application position, the passages 114 and 130 are lapped and fluid under pressure is supplied from the reservoir 6 to the brake cylinder 7 by way of passage 110, valve chamber 68 of the service magnet valve device, a passage 148, cavity 149 in the slide valve 56, and passage and pipe 128, thus operating the usual brake cylinder piston to apply the brakes.

When the valve 66 seats, the supply of fluid under pressure to the piston chamber 59 of the emergency valve device, by way of passage 110, valve chamber 68, and passage 112, is closed off, but with the application slide valve in application position, this piston chamber 53 is supplied with fluid under pressure from the valve chamber 57 by way of cavity 113 in the slide valve 56 and passage 112, thus the pressure of fluid is maintained in this chamber and the emergency piston and slide valve will remain in their normal positions, as shown in the drawing.

A full service application of the brakes is effected when the brake cylinder pressure and main reservoir pressure equalize, and if it is desired to effect a service application of the brakes, less than a full service application, the device 1 is operated to lap position, in which the contact 13 of the drum 11 of the device 1 will remain in contact with the contact terminal 24 so that the release magnet 51 will be maintained energized as in service position. In lap position the contact 14 on the drum 11 contacts with the contact terminal 25 so that current flows from the drum 11 through contact terminal 25, wire 89, magnet 52, wire 98, contact terminal 35 of the device 3, drum 12 of the device 3, wire 92, contact terminal 22, connector 20', contact terminal 23 of the device 1 to ground, thus energizing the service magnet 52.

The energization of the magnet 52 causes the valve 67 to be seated and the valve 66 to be unseated. The seating of the valve 67 closes off the further supply of fluid under pressure from the reservoir 6 to the brake cylinder 5.

When it is desired to stop the car and open the doors at the front end thereof, the device 1 is operated to service door open position, in which a service application of the brakes will be effected in the same manner as has hereinbefore been described. With the device 1 in this position, the contact 15 will contact with the contact terminal 26 and current will flow from the drum 11, contact terminal 26, wire 90, magnet 84 to ground 91, thus energizing the magnet 84.

The energization of the magnet 84 causes the valve 137 to be seated, closing communication of the piston chamber 138 with the atmosphere, and the valve 133 to be unseated, permitting fluid under pressure in the valve chamber 134 to flow into the piston chamber 138 of the piston device 83 by way of pipe 140, causing the piston 139 to move outwardly against the pressure of a spring 142. The stem 144 of this piston is operatively connected with an arm 145 of the valve device 82, and when the piston is thus operated the arm 145 will be rotated so that fluid under pressure will be vented from one of the piston chambers of the door engine 9 and supplied, from the pipe 120, to the other piston chamber, thus operating the door engine pistons to open the doors.

To release the brakes after a service application, the device 1 is operated to release position in which the release magnet 51 is deenergized and the service magnet 52 is energized. The release magnet being deenergized, the valve 63 is seated, closing off communication of the piston chamber 54 with the atmosphere, and the valve 64 is unseated and fluid under pressure flows from the reservoir 6 to the piston chamber 54 by way of passage 110, past the unseated valve 64, valve chamber 65 and passage 111. When the pressure of fluid supplied to the chamber 54 and acting on one side of the piston 53 is equal to the pressure of fluid in valve chamber 57, acting on the other side of the piston, the pressure of the spring 55 will cause the piston and slide valve to move downwardly to its normal release position in which fluid under pressure in the brake cylinder 7 will be vented to the atmosphere by way of passage and pipe 128, cavity 129 in the emergency slide valve 61, passage 130, cavity 131 in the service slide valve 56 and atmospheric passage 132.

When the device 1 is operated from service door open position, to any other position, the circuit, through the magnet 84, is opened and the magnet is deenergized and the pressure of the spring 135 will cause the valve 133 to be seated, closing off further supply of fluid under pressure to the piston chamber 138, and the valve 137 to be unseated, thus venting fluid under pressure from the piston chamber 138 to the atmosphere, by way of pipe 140, chamber 141, past the open valve 137, through valve chamber 136 and atmospheric passage 136'. With the piston chamber 138 thus vented, the pressure of the spring 142 will cause the piston 139 to move inwardly, operating the valve device 82 to control the flow of fluid under pressure to and from the door engine to close the doors.

With the device 1 in release position, and the operator wishes to effect an emergency application of the brakes, he operates the device to emergency position, in which the magnet 51 of the release magnet valve device remains deenergized and the magnet 52 of the service magnet valve device is deenergized. With the magnet 51 deenergized, communication between the reservoir 6 and the piston chamber 54 of the service valve device 49 is maintained through passage 110, past the unseated valve 64, through the valve chamber 65 and passage 111, so that the pressure of the spring 55 will maintain the piston 53 and slide valve 56 in their normal positions as shown in the drawing. The magnet 52 being deenergized, the valve 66 will be seated, thus closing communication from the passage 110 to the passage 112, closing off further supply of fluid under pressure to the emergency piston chamber 59.

When the device 1 is thus operated, the cam 43 on the spindle 10 causes the valve 40 to be seated and the valve 41 to be unseated. With the valve 41 unseated, fluid under pressure in the emergency piston chamber 59 is vented to the atmosphere through passage 112, cavity 113 in the service slide valve 56, passage and pipe 114, valve chamber 115 in the double check valve 117, pipe and passage 118, valve chamber 39 and past the unseated valve 41. Pressure of fluid in the emergency valve chamber 62 causes the emergency piston 58 and slide valve 61 to move to their upper or emergency positions in which fluid under pressure is supplied to the brake cylinder 7 from the valve chamber 62 through passage and pipe 128, said valve chamber being supplied with fluid under pressure from the reservoir 6 by way of passage 110.

With the slide valve 61 in emergency position, fluid under pressure is supplied from the sanding reservoir 121 to the usual sand traps (not shown) through pipe and passage 123, a cavity 154 in the slide valve 61, a passage and pipe 155, sanding pipe 156, and past a check valve 157 at each end of the car.

Since the door engines 9 are supplied with fluid under pressure from the sanding reservoir 121 by way of pipes 123 and 120, the blow down of the sanding reservoir pressure will automatically balance the doors without having to operate the door controlling magnet valve devices.

When the device 1 is in service or lap position, the service piston 53 and slide valve 56 will be in their service positions, due to the piston chamber 54 being vented to the atmosphere, all of which has been fully described. Now, if the operator wishes to effect an emergency application of the brakes, he operates the device 1 from service or lap position to emergency position, in which the magnets 51 and 52 are both deenergized. Upon deenergization of the magnet 51 the valve 63 will be seated and the valve 64 unseated, the seating of the valve 63 closing communication from the piston chamber 54 to the atmosphere and the unseating of the valve 64 establishing communication through which fluid under pressure is supplied from the reservoir 6 to the piston chamber 54 by way of passage 110, past the unseated valve 64, valve chamber 65 and passage 111. When the pressure of fluid in the chamber 54, acting on one side of the piston 53, equals the pressure of fluid in the valve chamber 57, acting on the other side of the piston, the pressure of the spring 55 causes the piston and slide valve 56 to move downwardly to their normal positions as shown in the drawing, and the emergency application will be effected in the manner hereinbefore described.

To release the brakes after an emergency application, the device 1 is operated to release position, in which the release magnet 51 remains deenergized and the service magnet is energized. As the device is thus operated, the cam 43 thereof is rotated, permitting the spring actuated plunger to seat the valve 41, thus closing off communication of the emergency piston chamber 59 with atmosphere. In emergency position, the service piston 53 and slide valve 56 are maintained in their normal positions as shown in the drawing and as the magnet 51 is maintained energized in release, the piston and slide valve will not operate from this normal position. Upon energization of the service magnet 52 the valve 66 is unseated so that fluid under pressure is supplied from the reservoir 6 to the emergency piston chamber 59 through passage 110, past the unseated valve 66, through valve chamber 68, and passage 112. When the pressure of fluid thus supplied to this chamber acting on one side of the piston 58, equals the pressure of fluid in the emergency valve chamber 62, acting on the other side of this piston, the pressure of the spring 60 will move the piston and slide valve 61 to their lower or normal positions as shown in the drawing.

With the slide valve 61 in its normal position, fluid under pressure in the brake cylinder is vented to the atmosphere by way of pipe and passage 128, cavity 129 in the emergency slide valve 61, passage 130, cavity 131 in the service slide valve 56 and atmospheric passage 132.

With a manually effected emergency application of the brakes, the operator, by holding the handle 17 of the device 1 depressed, maintains the circuit to the magnet of the magnet switch device 8 closed through the supply wire 86, wire 107 to which one terminal of the magnet is connected, wire 98 to which the other terminal of the magnet is connected, contact terminal 35 and contact 31 of the drum 12 of the device 3, wire 92, contact terminal 22 of the device 1, connector 20', and contact terminal 23 to ground, thus maintaining the magnet energized. With the magnet energized, the control circuit will be closed through the supply wire 86, wire 107, switch contact 105, connector 104, switch contact 106, and wire 108. It will thus be seen that with a manually effected emergency application of the brakes, the operator will not lose control of the power circuit to the car motors.

Should the operator release the handle 17 of the device 1 when the brakes are released, pressure of the spring 21 will cause the arm 20 to move downwardly, permitting the valve 127 of the device 1 to unseat, and causing the connector 20' to move out of contact with the contact terminals 22 and 23, opening the circuit through the magnet 52, thus deenergizing it. The magnet 51 will remain deenergized.

Since the valve 41 is seated when the device 1 is in release position, the automatic emergency application will be effected by the venting of fluid under pressure from the emergency piston chamber 59 by way of pipe 118, in the same manner as has been described in connection with the manual emergency application past the unseated valve 71 of the combined foot switch and foot valve device 2, valve chamber 69, passage and pipe 125, chamber 126 in the casing of the device 1, and past the unseated valve 127 to atmosphere.

When the connector 20' of the device 1 is moved out of contact with the contact terminals 22 and 23, the ground connection from the magnet of the magnet switch device is open, thus the magnet is deenergized and the switch device operates to open the power circuit to the car motors, thus rendering said motors ineffective to further propel the car.

If for any reason the operator desires to release his hold on the lever 17 without effecting an automatic emergency application of the brakes, he first depresses the foot button 73, which causes the valve 71 of the device 2 to be seated, thus closing communication of the pipe 118 with the pipe 125, so that when the handle 17 is released and the valve 127 is unseated, there will be no flow of fluid under pressure from the pipe 118 to atmosphere.

When the foot button 73 is thus depressed, the connector 77 will contact with the contact terminals 78 and 79 so that when the handle 17 is released and the connector 20' of the device 1 moves out of contact with the contact terminals 22 and 23, the circuit through the service magnet 52 will be maintained closed through wire 92, contact terminal 79, connector 77, contact terminal 78, and wire 97 to ground 95.

In case of power failure with the device 1 in release position, no application of the brakes will be effected, and this is due to the valve 41 of the device 1 being seated, preventing the flow of fluid under pressure from the emergency piston chamber 59 and is also due to the valve 63 being seated, preventing the flow of fluid under pressure from the service piston chamber 54.

When there is a power failure, the magnet of the magnet switch device will be deenergized, causing the connector 104 to be moved out of contact with the contact terminals 105 and 106, thus opening the power circuit to the motors, thus rendering said motors ineffective for further propelling the car.

In an emergency application of the brakes, sanding of the track rails, from both ends of the car is controlled automatically. At any other time, the sanding at the head end of the car is under the control of the operator. By moving the outer end of the lever 47 upwardly about the fulcrum pin 18, the inner end of the lever will engage the upper end of the stem 46 of the valve 45 and cause said valve to unseat against the pressure of spring 48. With the valve 45 thus unseated, fluid under pressure in the valve chamber 44 will flow to the sand traps at the head end of the car, past the unseated valve 45 and through passage and pipe 159.

In case of a power failure with the device 1 in release position, the magnet 52 will be deenergized, and consequently the valve 66 will be seated, closing communication of the reservoir 6 with the pipe 118. Now, if it is desired to effect an application of the brakes, the handle 17 may be released, which permits the pressure of the spring 21 to move the arm 20 downwardly, so that the valve 127 will be unseated and fluid under pressure from the emergency piston chamber 59 will be vented to the atmosphere past this unseated valve 127. Since the valve 41 of the device 1 is unseated in all positions except release position, the handle 17 may be rotated to vent fluid under pressure from the emergency piston chamber 59 to the atmosphere past the unseated valve 41.

To release the brakes after such an application, a plug valve 160 is provided having a restricted passage 161 therethrough, which valve is adapted to be rotated manually so that the passage 161 connects the passages 110 and 112, and fluid under pressure from the reservoir 6 will flow from the passage 110 through passage 161 and passage 112 to the emergency piston chamber 59, which causes the emergency piston 58 and slide valve 61 to operate to vent fluid under pressure from the brake cylinder 7 in the same manner as has been described in connection with the release of the brakes after an emergency application.

While one illustrative embodiment of the invention has been described in detail, it is not my invention to limit its scope to that embodiment or otherwise than by the terms of the appended claims.

Having now described my invention, what I claim as new and desire to secure by Letters Patent, is:—

1. In an electro-pneumatic brake, the combination with a brake cylinder, of two valve devices for controlling communication through which fluid is released from said brake cylinder, one of said devices being operative at one time to supply fluid under pressure to said brake cylinder to effect a service application of the brakes and the other of said devices being operative at another time to supply fluid under pressure to said brake cylinder to effect an emergency application of the brakes, electrically controlled valve means operative to control the operation of one of said valve devices, and a valve, said valve and electrically controlled valve means being adapted to control the operation of the other of said valve devices.

2. In an electro-pneumatic brake, the combination with a brake cylinder, of two valve devices for controlling communication through which fluid is released from said brake cylinder, one of said devices being operative at one time to supply fluid under pressure to said brake cylinder to effect a service application of the brakes and the other of said devices being operative at another time to supply fluid under pressure to said brake cylinder to effect an emergency application of the brakes, and a valve, said valve and electrically controlled means controlling the operation of said valve devices, a handle, and means operative by said handle for controlling the operation of said valve and for controlling the circuits of said electrically controlled means.

3. In an electro-pneumatic brake, the combination with a brake cylinder, of two valve devices for controlling communication through which fluid is released from said brake cylinder, one of said devices being operative at one time to supply fluid under pressure to said brake cylinder to effect a service application of the brakes and the other of said devices being operative at another time to supply fluid under pressure to said brake cylinder to effect an emergency application of the brakes, and a valve, said valve and electrically controlled means controlling the operation of said valve devices, a handle, means operative by said handle for controlling the operation of said valve and for controlling the circuits of said electrically controlled means, and means operated upon the release of said handle for effecting the operation of one of said valve devices to cause an emergency application of the brakes.

4. In an electro-pneumatic brake, the combination with two brake magnets, of a valve, means operative upon the energization of one of said magnets and the deenergization of the other of said magnets for effecting a service application of the brakes and operative upon the deenergization of both of said magnets and the operation of said valve for effecting an emergency application of the brakes.

5. In an electro-pneumatic brake, the combination with two brake magnets, of a valve, means operative upon the energization of one of said magnets and the deenergization of the other of said magnets for effecting a service application of the brakes and operative upon the deenergization of both of said magnets and the operation of said valve for effecting an emergency application of the brakes, means for controlling the circuits of said magnets and for controlling the operation of said valve, and a handle for operating said means.

6. In an electro-pneumatic brake, the combination with a valve operative to different positions and two brake magnets, of means operative upon the operation of said valve to one position, the deenergization of one of said magnets and the energization of the other of said magnets for effecting the release of the brakes and operative upon the operation of said valve to another position and the deenergization of both of said magnets to effect an emergency application of the brakes.

7. In an electro-pneumatic brake, the combination with a valve operative to different positions and two brake magnets, of means operative upon the operation of said valve to one position, the deenergization of one of said magnets and the energization of the other of said magnets for effecting the release of the brakes and operative upon the operation of said valve to another position and the deenergization of both of said magnets to effect an emergency application of the brakes, and means under the control of an operator for preventing an emergency application of the brakes from being effected when the brakes are released and the magnets are deenergized upon a current supply failure.

8. In an electro-pneumatic brake, the combination with a valve operative to different positions and two brake magnets, of means operative upon the operation of said valve to one position, the deenergization of one of said magnets and the energization of the other of said magnets for effecting the release of the brakes and operative upon the operation of said valve to another position and the deenergization of both of said magnets to effect an emergency application of the brakes, and means under the control of an operator for preventing an emergency application of the brakes from being effected when the brakes are released and the magnets are deenergized upon a current supply failure, said means being operative manually to effect an application of the brakes when the current supply is off.

9. In an electro-pneumatic brake, the combination with a valve operative to different positions and two brake magnets, of means operative upon the operation of said valve to one position, the deenergization of one of said magnets and the energization of the other of said magnets for effecting the release of the brakes and operative upon the operation of said valve to another position and the deenergization of both of said magnets to effect an emergency application of the brakes, and means under the control of an operator for either maintaining the brakes released or for effecting an application of the brakes when the deenergization of said magnets is caused by the failure of the current supply.

10. In an electro-pneumatic brake, the combination with a valve operative to different positions and two brake magnets, of means operative upon the operation of said valve to one position, the deenergization of one of said magnets and the energization of the other of said magnets for effecting the release of the brakes and operative upon the operation of said valve to another position and the deenergization of both of said magnets to effect an emergency application of the brakes, and means under the control of an operator for maintaining the brakes released when the magnets are deenergized due to failure of the current supply.

11. In an electro-pneumatic brake, the combination with a valve operative to different positions and two brake magnets, of means operative upon the operation of said valve to one position, the deenergization of one of said magnets and the energization of the other of said magnets for effecting the release of the brakes and operative upon the operation of said valve to another position and the deenergization of both of said magnets to effect an emergency application of the brakes, and valve means under the control of an operator for either maintaining the brakes released or for effecting an application of the brakes when said magnets are both deenergized due to failure of the current supply.

12. In an electro-pneumatic brake, the combination with a valve having two positions and brake magnets, of means operative upon the operation of said valve to one position and the deenergization of said magnets for effecting an emergency application of the brakes, said valve in its other position being adapted to prevent an emergency application of the brakes when said magnets are deenergized upon a failure of the current supply.

13. In an electro-pneumatic brake, the combination with a valve having two positions and brake magnets, of means operative upon the operation of said valve to one position and the deenergization of said magnets for effecting an emergency application of the brakes, said valve in its other position being adapted to prevent an emergency application of the brakes when said magnets are deenergized upon a failure of the current supply, and means under the control of an operator for effecting an application of the brakes while the current supply is off.

14. In an electro-pneumatic brake, the combination with a valve having two positions and brake magnets, of means operative upon the operation of said valve to one position and the deenergization of said magnets for effecting an emergency application of the brakes, said valve in its other position being adapted to prevent an emergency application of the brakes when said magnets are deenergized upon a failure of the current supply, and means under the control of an operator and independent of said valve for effecting an application of the brakes while the current supply is off.

15. In an electro-pneumatic brake, the combination with electrically controlled means operative at one time for effecting a service application of the brakes, of a valve, said valve and said electrically controlled means being operative at another time for effecting an emergency application of the brakes, and means operative to control the operation of said valve and to control the circuits of said electrically controlled means.

16. In an electro-pneumatic brake, the combination with electrically controlled means operative at one time for effecting a service application of the brakes, of a valve, said valve and said electrically controlled means being operative at another time for effecting an emergency application of the brakes, means for controlling the operation of said valve and the circuits of said electrically controlled means, a handle for operating the controlling means, and means operative upon the release of said handle to effect an emergency application independently of said valve.

17. In an electro-pneumatic brake, the combination with a brake cylinder, of a service valve device and an emergency valve device having release positions in which fluid is released from said brake cylinder, a magnet valve device normally deenergized and establishing communication through which fluid under pressure is supplied to said service valve device to maintain it in release position, another magnet valve device normally energized and establishing communication through which fluid under pressure is supplied to said emergency valve device for maintaining it in release position, the first mentioned valve device being operative upon energization for establishing communication through which fluid is released from said service valve device to permit said service valve device to operate to establish communication through which fluid under pressure supplied by the second mentioned magnet valve device is supplied to said brake cylinder.

18. In an electro-pneumatic brake, the combination with an emergency valve device having valve means for controlling the application and release of the brakes and a piston operated upon a reduction in fluid pressure for operating said valve means to apply the brakes and upon an increase in fluid pressure for operating said valve means to release the brakes, of electrically controlled means operative upon energization for supplying fluid under pressure to said piston in effecting a release of the brakes and operative upon deenergization for closing off the supply of fluid under pressure to said piston in effecting an application of the brakes, means having a release position in which the pressure of fluid on said piston is retained and the electrically controlled means energized and having an emergency position in which the pressure of fluid on said piston is released and the electrically controlled means are deenergized, a handle for operating said means, and means operated upon the release of said handle for releasing the pressure of fluid on said piston to effect an application of the brakes.

19. In an electro-pneumatic brake, the combination with a brake cylinder, of a service valve device and an emergency valve device having release positions in which fluid is released from said brake cylinder, a magnet valve device normally deenergized and establishing communication through which fluid under pressure is supplied to said service valve device to maintain it in release position, another magnet valve device normally energized and establishing communication through which fluid under pressure is supplied to said emergency valve device for maintaining it in release position, the first mentioned valve device being operative upon energization for establishing communication through which fluid is released from said service valve device to permit said service valve device to operate to establish communication through which fluid under pressure supplied by the second mentioned magnet valve device is supplied to said brake cylinder, and a switch device operative to control the circuits of said magnet valve device.

20. In an electro-pneumatic brake, the combination with a brake cylinder, of a service valve device and an emergency valve device having release positions in which fluid is released from said brake cylinder, a magnet valve device normally deenergized and establishing communication through which fluid under pressure is supplied to said service valve device to maintain it in release position, another magnet valve device normally energized and establishing communication through which fluid under pressure is supplied to said emergency valve device for maintaining it in release position, the first mentioned valve device being operative upon energization for establishing communication through which fluid is released from said service valve device to permit said service valve device to operate to establish communication through which fluid under pressure supplied by the second mentioned magnet valve device is supplied to said brake cylinder, means operative to control the circuits of said magnet valve devices, a handle for operating said means, and means operative upon the release of said handle for deenergizing both of said magnet valve devices to effect the operation of said emergency valve device to emergency position in which communication is established through which fluid under pressure is supplied to said brake cylinder.

21. In an electro-pneumatic brake, the combination with a brake cylinder, of a service valve device and an emergency valve device having release positions in which communication is established through which fluid from said brake cylinder is released, said emergency valve device being operative upon a reduction in fluid pressure for supplying fluid under pressure to said brake cylinder, two magnet valve devices being deenergized in effecting an emergency application, one of said magnet valve devices when deenergized establishing communication through which fluid under pressure is supplied to said service valve device to maintain said service valve device in release position and the other of said magnet valve devices when deenergized closing off communication through which fluid under pressure is supplied to said emergency valve device, means having an emergency position in which the circuits of said magnet valve devices are open, a valve for establishing communication through which fluid under pressure is released from said emergency valve device when said means are in emergency position, said means having a release position in which said valve closes the last mentioned communication, and means under the control of an operator for at any time releasing, independently of said valve device, fluid under pressure from said emergency valve device to effect an application of the brakes.

22. In an electro-pneumatic brake, the combination with a brake cylinder, of a service valve device and an emergency valve device having release positions in which communication is established through which fluid from said brake cylinder is released, said emergency valve device being operative upon a reduction in fluid pressure for supplying fluid under pressure to said brake cylinder, two magnet valve devices being deenergized in effecting an emergency application, one of said magnet valve devices when deenergized establishing communication through which fluid under pressure is supplied to said service valve device to maintain said service valve device in release position and the other of said magnet valve devices when deenergized closing off communication through which fluid under pressure is supplied to said emergency valve device, means having an emergency position in which the circuits of said magnet valve devices are open, a valve for establishing communication through which fluid under pressure is released from said emergency valve device when said means are in emergency position, said means having a release position in which said valve closes the last mentioned communication, and means controlled by an operator for maintaining the brakes released when the first mentioned means are in release position and said magnet valve devices are deenergized upon a current supply failure.

23. In an electro-pneumatic brake, the combination with a brake cylinder, of a service valve device and an emergency valve device having release positions in which communication is established through which fluid from said brake cylinder is released, said emergency valve device being operative upon a reduction in fluid pressure for supplying fluid under pressure to said brake cylinder, two magnet valve devices being deenergized in effecting an emergency application, one of said magnet valve devices when deenergized establishing communication through which fluid under pressure is supplied to said service valve device to maintain said service valve device in release position and the other of said magnet valve devices when deenergized closing off communication through which fluid under pressure is supplied to said emergency valve device, means having an emergency position in which the circuits of said magnet valve devices are open, a valve for establishing communication through which fluid under pressure is released from said emergency valve device when said means are in emergency position, said means having a release position in which one of said magnet valve devices is energized to establish communication through which fluid under pressure is supplied to said emergency valve device in effecting the release of the brakes and in which said valve closes communication through which the pressure of fluid in said emergency valve is reduced, and means controlled by an operator for maintaining the brakes released when the first mentioned means are in release position and said magnet valve devices are deenergized due to a current supply failure.

24. In an electro-pneumatic brake, the combination with an emergency valve device operated upon a reduction in fluid pressure for effecting an emergency application of the brakes, of normally energized electrically controlled means for supplying fluid under pressure to said valve device, means operative for reducing the pressure of fluid in said valve device to effect an emergency application of the brakes, and means operative at the same time as the first mentioned means are operated for deenergizing said electrically controlled means to cut off the flow of fluid to said valve device.

25. In a safety control brake, the combination with a service valve device and an emergency valve device for controlling the brakes, of a magnet valve device for controlling the operation of said service valve device, a magnet valve device for supplying fluid under pressure to operate said emergency valve device, the last mentioned magnet valve device being operative upon a current supply failure to close off the supply of fluid under pressure to said emergency valve device, and means operative to establish communication through which fluid under pressure is supplied to said emergency valve device independently of last mentioned magnet valve device.

26. In a safety control brake, the combination with an emergency valve device having an emergency position and a release position, of electrically controlled means operative upon energization to supply fluid under pressure to said emergency valve device to maintain said valve in release position and operative upon deenergization to close off the flow of fluid under pressure to said emergency valve device, and means operative to establish communication through which fluid under pressure is supplied to said emergency valve device when said magnet valve device is deenergized due to a current supply failure.

27. In an electro-pneumatic brake, the combination with a brake cylinder, of two pneumatic valve devices normally establishing communication through which fluid under pressure is released from said brake cylinder, a magnet valve device, said magnet valve device and one of said pneumatic valve devices being operative to establish communication through which fluid under pressure is supplied to said brake cylinder to effect an application of the brakes and a magnet valve device operative to control the operation of the last mentioned pneumatic valve device.

28. In an electro-pneumatic brake, the combination with a brake cylinder, of two pneumatic valve devices normally establishing communication through which fluid under pressure is released from said brake cylinder, a magnet valve device, said magnet valve device and one of said pneumatic valve devices being operative to establish communication through which fluid under pressure is supplied to said brake cylinder to effect an application of the brakes, and two magnet valve devices, one of said magnet valve devices being operative upon energization to effect the operation of one of said pneumatic valve devices to application position, and the other of said magnet valve devices being operative upon deenergization to establish communication through which fluid under pressure is supplied through the last mentioned valve device to said brake cylinder.

29. In a safety car control and brake equipment, the combination with electrically controlled means operative upon deenergization to effect an emergency application of the brakes, and means under the control of an operator for preventing an emergency application of the brakes from being effected when said electrically controlled means are deenergized upon the failure of the current supply.

30. In a safety car control and brake equipment, the combination with electrically controlled means operative upon deenergization to effect an emergency application of the brakes, and a combined brake switch and brake valve device operative to prevent an emergency application of the brakes from being effected when said electrically controlled means are deenergized due to failure of the current supply.

31. In a safety car control and brake equipment, the combination with electrically controlled means operative upon deenergization to effect an emergency application of the brakes, and means under the control of an operator for preventing an emergency application of the brakes from being effected when said electrically controlled means are deenergized upon the failure of the current supply, said means being operative to effect an application of the brake while the current supply is off.

32. In a safety car control and brake equipment, the combination with electrically controlled means operative upon deenergization to effect an emergency application of the brakes, and a combined brake switch and brake valve device and a combined foot switch and foot valve device, either of which is operative to prevent an emergency application of the brake from being effected when said electrically controlled means are denergized due to failure of the current supply.

33. In a safety car control and brake equipment, the combination with electrically controlled means operative upon deenergization to effect an emergency application of the brakes, and a combined brake switch and brake valve device and a combined foot switch and foot valve device, either of which is operative to prevent an emergency application of the brake from being effected when said electrically controlled means are deenergized due to failure of the current supply and either operative when the current is off to effect an application of the brakes.

In testimony whereof I have hereunto set my hand, this 7th day of August, 1928.

THOMAS H. THOMAS.